United States Patent [19]

Lee et al.

[11] 3,848,209

[45] Nov. 12, 1974

[54] MAGNETIC FIELD COIL ASSEMBLY FOR A MAGNETIC BUBBLE DOMAIN DEVICE

[75] Inventors: Fred S. Lee; Jonas K. Vysniauskas, both of Oklahoma City, Okla.

[73] Assignee: Honeywell Information Systems Inc., Waltham, Mass.

[22] Filed: Jan. 2, 1974

[21] Appl. No.: 430,366

[52] U.S. Cl. .................. 336/188, 336/200, 336/225, 340/174 TF, 340/174 MA

[51] Int. Cl. .................. H01f 27/30

[58] Field of Search .................. 340/174 TF, 174 MA; 336/200, 223, 220, 188, 225

[56] References Cited

UNITED STATES PATENTS

| | | | |
|---|---|---|---|
| 2,823,360 | 2/1958 | Jones | 336/200 X |
| 3,638,156 | 1/1972 | West | 336/223 |

FOREIGN PATENTS OR APPLICATIONS

| | | | |
|---|---|---|---|
| 1,911,475 | 11/1969 | Germany | 336/200 |

OTHER PUBLICATIONS

"IBM Technical Disclosure Bulletin," Bogholtz et al., Vol. 15, No. 6, Nov. 1972.

*Primary Examiner*—Thomas J. Kozma
*Attorney, Agent, or Firm*—Gerald R. Woods

[57] ABSTRACT

A modular orthogonal coil assembly for providing propagating magnetic fields for magnetic bubble domains has upper and lower boards and interconnecting side sheets, all of which carry etched sets of conductors. Conductors on the upper board are tied to conductors on the lower board through conductors on the interconnecting sheets to form coil turns. Removable connectors hold the interconnecting sheets in place relative to the upper and lower boards.

4 Claims, 4 Drawing Figures

MAGNETIC FIELD COIL ASSEMBLY FOR A MAGNETIC BUBBLE DOMAIN DEVICE

BACKGROUND OF THE INVENTION

The present invention relates to magnetic bubble domain devices and more particularly to a modular orthogonal coil assembly for establishing a magnetic propagating field for bubble domains.

In magnetic bubble domain materials, data is represented by a series of magnetic domains or bubbles which can be shifted or propagated along Permalloy data tracks on the material surface by a rotating magnetic field. The rotating magnetic field is established by orthogonal coils which surround the magnetic bubble domain material.

In certain prior art systems, each of these coils is formed by winding a continuous conductor using conventional coil forming techniques. The use of such techniques presents certain problems. The cost of forming and assembling the coils is relatively high since each coil is individually made. Moreover, while it is important that lengths of conductors in the coil be parallel to one another for accurate field control, it is hard to maintain parallelism while using conventional coil forming techniques. Another drawback to the use of conventional techniques is that the widest dimension of the board carrying the domain material must be narrower than the narrowest dimension of the innermost coil opening. Finally, wound orthogonal coil systems are not easily disassembled once they have been assembled, limiting access to the domain material board if repairs become necessary.

Certain of these problems are solved in a coil assembly disclosed in an International Business Machines Corporation Technical Report TR22.1613, dated 23 Mar. 1973. Orthogonal arrays of parallel copper strips are etched on opposite sides of each of two laminated epoxy sheets. Each strip forms a half turn of one of the orthogonal coils of the two coil assemblies. Each strip on one of the epoxy sheets is connected to a corresponding strip on the other epoxy sheet through a conductive pin to form a coil turn. Because batch fabrication techniques are employed, the spacing and orthogonality of the strips can be precisely controlled. However, the costs of assembly may be high since a large number of pins must be inserted between the spaced epoxy sheets to complete the coil turns. Furthermore, it appears the coil assembly cannot be easily disassembled, making it difficult to reach the domain material board to effect any necessary repairs.

SUMMARY OF THE INVENTION

The present invention makes extensive use of batch fabrication techniques to simplify assembly and disassembly operations while minimizing component costs.

A coil assembly constructed in accordance with the invention includes first and second generally rectangular planar boards, each of which has orthogonal sets of parallel conductors extending across the major surfaces. Four generally rectangular interconnecting sheets are also included. Each of these sheets has a set of parallel conductors extending across its surface. A removable connector secures the conductors at each edge of a board in registration with the conductors at an edge of an interconnecting sheet to form coil turns. Since the boards and the interconnecting sheets are batch fabricated, the spacing and orthogonality of all conductors can be precisely controlled while manufacturing costs are minimized. The interconnecting sheets are fabricated as a single component and are easily assembled and disassembled by means of the removable connectors.

DESCRIPTION OF THE DRAWINGS

While the specification concludes with claims particularly pointing out and distinctly claiming that which is regarded as the present invention, the details of a preferred embodiment of the invention may be more readily ascertained from the following detailed description when read in conjunction with the accompanying drawings wherein:

DETAILED DESCRIPTION

Figure 1:
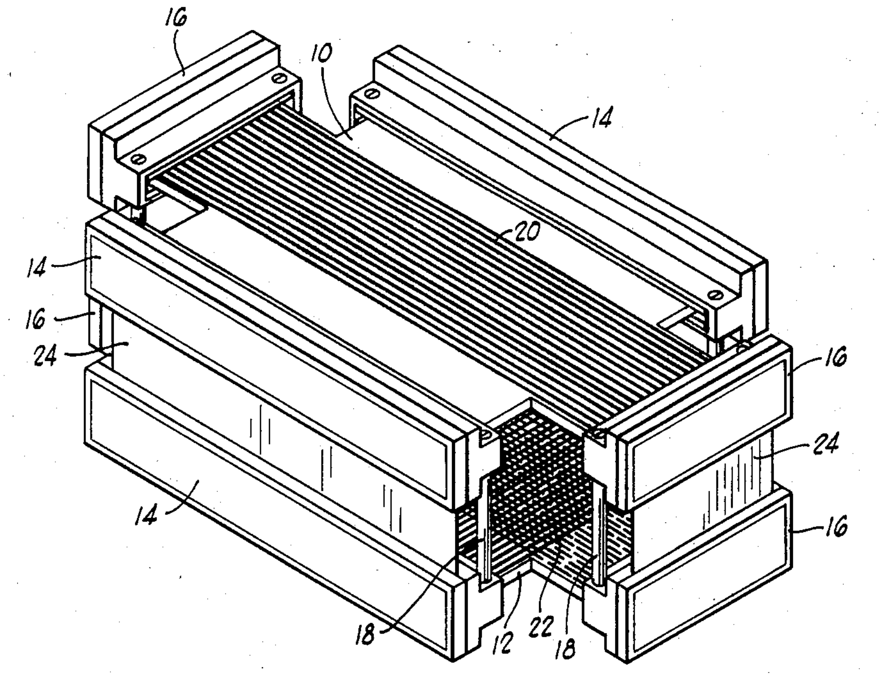
FIG. 1 is a perspective view of a completed orthogonal coil assembly fabricated in accordance with the present invention.

Referring now to FIG. 1, an orthogonal coil assembly includes an upper planar board 10 and a spaced, lower planar board 12, both of which may be made of conventional epoxy material. Each of the longer edges of the boards 10 and 12 is held by an elongated connector 14. There are four such connectors in the completed coil assembly but only three can be seen in FIG. 1. Each of the shorter sides of the boards 10 and 12 is held within a shorter connector 16. All four of the shorter connectors 16 in a completed coil assembly are shown at least in part in FIG. 1. The boards 10 and 12 are held apart by cylindrical spacers 18 secured to the connectors.

The visible or upper side of the upper planar surface 10 carries an etched set of parallel conductors 20 formed by batch fabrication techniques commonly used in the manufacture of printed wiring boards. The underside of board 10 (not visible in FIG. 1) also carries an etched set of parallel conductors orthogonal or perpendicular to the etched conductors 20 on the upper side of board 10. The lower board 12 has an etched set 22 of conductors which parallel the conductors on the underside of board 10. Conductors (not shown) formed on the underside of board 12 parallel the conductors 20 on the upper surface of the board 10.

Interconnecting sheets 24 are used to couple the conductors on the board 10 with the conductors on the board 12 at the connectors. Each of the interconnecting sheets 24 carries conductors which are parallel to and have the same spacing as the conductors on the boards.

Figure 2:
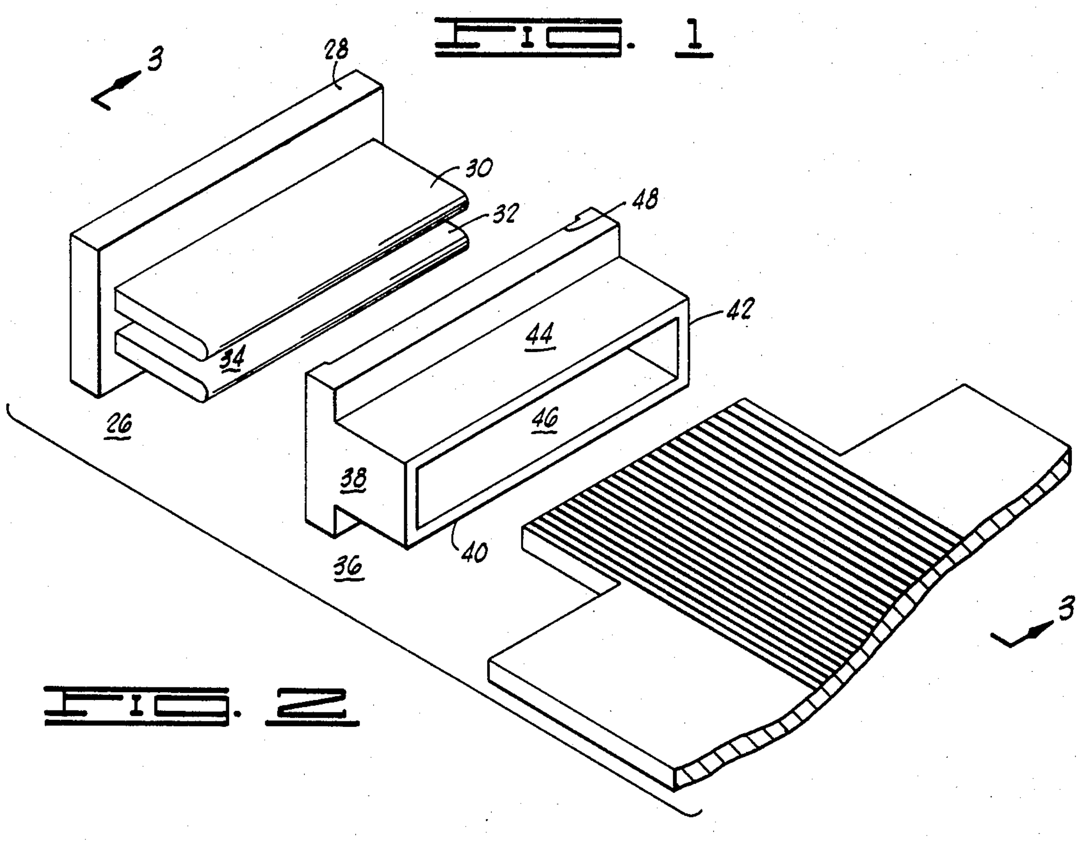
FIG. 2 is an exploded view showing details of connectors constructed in accordance with the present invention.

The details of a connector are shown in FIG. 2. The connector includes a male part 26 consisting of a base 28 and a pair of wall members 30 and 32 extending perpendicularly from the base 28. The interior or facing surfaces of the wall members 30 and 32 form a central recess 34 which receives both the interconnecting sheet 24 and one edge of board 10 or 12 in a manner more fully described later. The connector also includes a female part 36 having generally rectangular side walls 38, 40, 42 and 44 defining a central cavity 46 which can accept the wall members 30 and 32 of the part 26. The part 36 includes shallow recesses 48 and a bar member extending between the side walls 38 and 42 in alignment with the central recess 34 of the part 26. The bar member cannot be seen in FIG. 2 but is shown in cross section at 50 in FIG. 3, a cross sectional view of an assembled connector taken generally along the lines 3—3 in FIG. 2.

Figure 3:
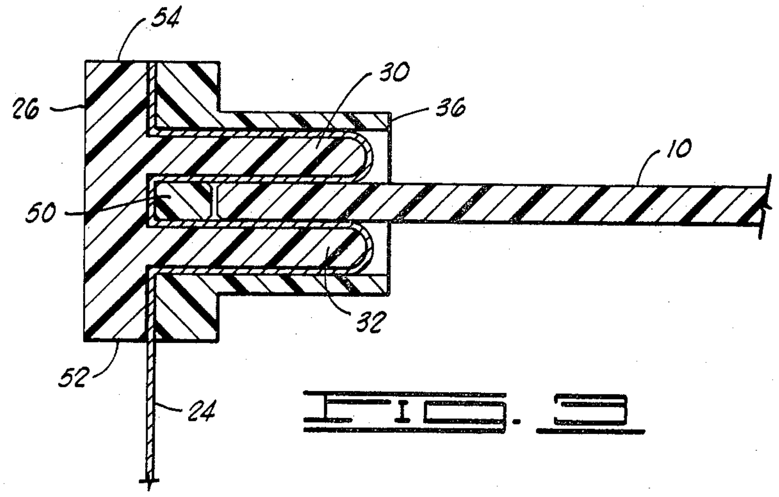
FIG. 3 is a cross sectional view of an assembled connector taken along lines 3—3 in FIG. 2.

Referring to FIG. 3, the conductors on a board, arbitrarily taken to be board 10, are coupled to the similarly spaced conductors on an interconnecting sheet 24 by a series of simple steps. A portion of an interconnecting sheet 24 is first loosely placed across the wall member 30 and 32 of part 26. The sheet 24 is then secured in place by sliding the wall member 30 and 32 into the central cavity 46 of the part 36. The bar 50 on part 36 moves into the central recess 34 and is seated against the base 28 of part 26.

In FIG. 3, the interconnecting sheet 24 is represented by a heavy black line which enters a bottom surface 52 through the shallow recess 48 in the part 36, extends along the inner and outer surfaces of the wall member 32, along the inner and outer surfaces of the wall member 30, and terminates at an upper surface 54. The inner dimensions of the central cavity 46 are substantially the same as the distance between the outer walls of the wall members 30 and 32. As a result, the interconnecting sheet 24 is held securely against the outer surfaces of the wall members 30 and 32 by the side walls of the part 36 and is held within the central recess 34 by the bar 50.

When interconnecting sheet 24 has been "locked" into place by sliding the parts 26 and 36 together, the connector is ready to receive an edge of the board 10. The height of the central recess 34 is approximately equal to the thickness of the board 10. As a result, the conductors on the sheet 10 make wiping contact with the conductors on interconnecting sheet 24 along one side of the central recess 34.

Figure 4:
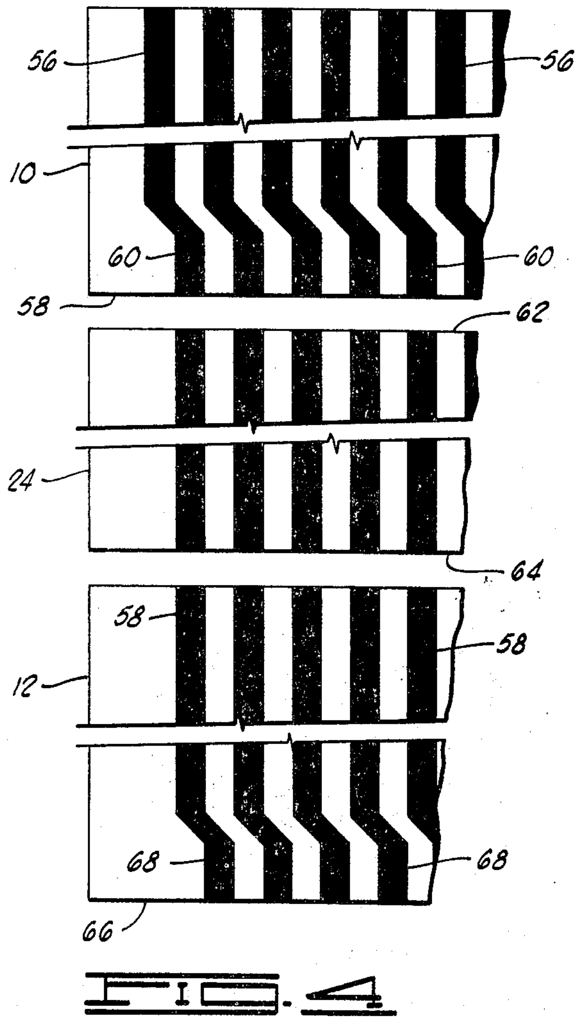
FIG. 4 is a greatly expanded plan view of certain portions of two boards and an interconnecting sheet for illustrating conductor configurations on the sheet surfaces.

To form a multi-turn coil, it is necessary to skew the ends of the etched conductors at one edge of each of the boards 10 and 12. This is shown in FIG. 4 which generally represents what a viewer would see if he were to look along lines 4—4 in FIG. 1 while removing the connector 16, tilting the board 10 up and the board 12 down. The height of the components 10, 24 and 12 is greatly compressed by a conventional drafting technique. Similarly, only a small portion of the width of each of the components is illustrated.

Referring to the representation of board 10, each etched conductor 56 extends across the surface of the board 10 in a straight line until it approaches an edge 58 of the board 10. At this point, each conductor 56 is skewed to the right terminating in an offset section 60. Conductors 58 which extend from an upper edge 62 of interconnecting sheet 24 to the lower edge 64 follow a straight line between those two surfaces. The conductors 58 formed on the board 12 are aligned with the offset section 60 of the conductors 56 on sheet 10 and extend in a straight line across the major surface of the board 12 to a point near the edge 66. At this point, the conductors 58 are skewed, terminating in an offset section 68. It will be seen that the offset sections 68 on board 12 and the conductors 56 on board 10 are aligned. These portions of the conductors would be electrically connected through another interconnecting sheet (not shown) to complete the coil.

While there has been described what is believed to be a preferred embodiment of the invention, it is obvious that variations and modifications will occur to those skilled in the art once they learn of the invention. Therefore, it is intended that the appended claims shall be construed to cover all such variations and modifications as fall within the true spirit and scope of the invention.

What is claimed is:

1. An orthogonal coil assembly for establishing a propogation field for magnetic bubble domains comprising:

a. first and second generally rectangular planar boards, each having orthogonal sets of parallel conductors extending across the major surfaces;
b. four generally rectangular interconnecting sheets, each having a set of parallel conductors extending across its surface, the conductors on said interconnecting sheets being spaced at the same intervals as the conductors on said planar boards; and
c. a plurality of removable connectors for securing the conductors at the edges of said planar boards in registration with the conductors at the edges of said interconnecting sheets to form orthogonal sets of electrically conducting coils.

2. An orthogonal coil assembly as recited in claim 1 wherein the conductors extending across the surfaces of said planar boards and said interconnecting sheets are deposited strips of conductive material.

3. A magnetic field coil assembly as recited in claim 2 wherein said interconnecting sheets are flexible.

4. A magnetic field coil assembly as recited in claim 3 wherein each of said connectors includes:

a. a male part having a base and a pair of upstanding wall members defining a central recess across which a portion of an interconnecting sheet may be positioned and into which one edge of a planar board may be inserted; and
b. a female part having rectangular side walls defining a central cavity for accepting the wall members of said male part and a bar extending between opposite sidewalls in alignment with the central recess of said male part, said bar serving to hold the interconnecting sheet in place within the central recess.

* * * * *